March 27, 1928.

C. J. FAY 1,664,201

THERMOSTATIC SWITCH

Filed March 10, 1927

WITNESSES:
E. A. McCloskey.
G. B. Fjoflat

INVENTOR
Carl J. Fay.
BY
Wesley L. Carr
ATTORNEY

March 27, 1928.
C. J. FAY
1,664,201
THERMOSTATIC SWITCH
Filed March 10, 1927
2 Sheets-Sheet 2
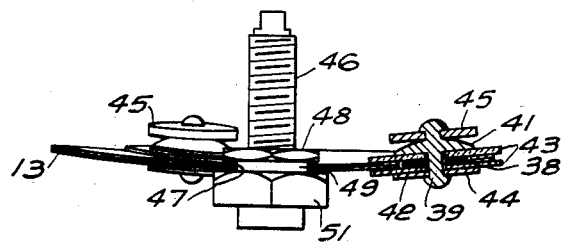
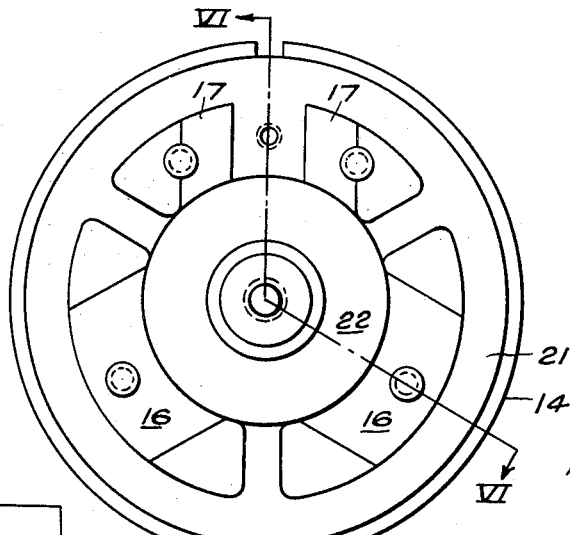
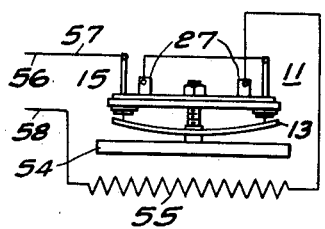
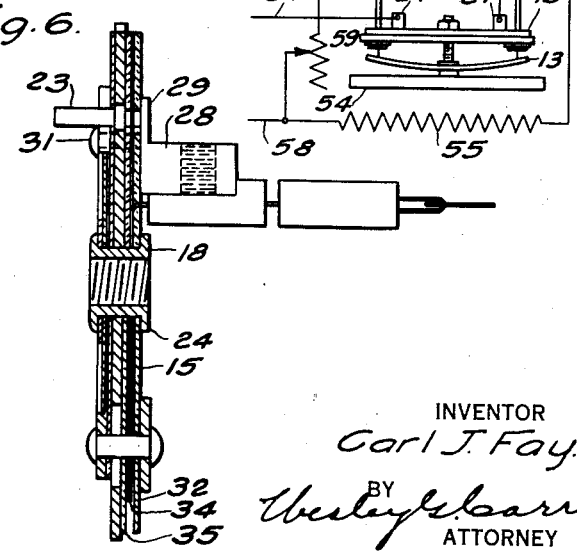
WITNESSES:
E. A. M'Closkey
G. B. Fjoflat
INVENTOR
Carl J. Fay.
BY
Wesley G. Carr
ATTORNEY Patented Mar. 27, 1928.

1,664,201

UNITED STATES PATENT OFFICE.

CARL J. FAY, OF MANSFIELD, OHIO, ASSIGNOR TO WESTINGHOUSE ELECTRIC & MANUFACTURING COMPANY, A CORPORATION OF PENNSYLVANIA.

THERMOSTATIC SWITCH.

Application filed March 10, 1927. Serial No. 174,111.

My invention relates to temperature-responsive devices and particularly to thermostatic switches. An object of my invention is to provide a thermostatic switch that shall be effective to maintain a uniform or average temperature.

Another object of my invention is to provide a means for a thermostatic switch that is normally operable to establish an electric circuit in response to a predetermined temperature and to interrupt said circuit when another temperature obtains, which means shall be effective to cause the said switch to be operable at one of said temperatures and a temperature intermediate said temperatures.

Another object of my invention is to provide a means for a thermostatic switch that is normally operable to a circuit-interrupting position in response to a temperature of a predetermined value and to a circuit-closing position in response to another temperature of a predetermined value that shall cause said switch to be actuable to the circuit-closing position when a temperature obtains therein that is of a value intermediate the said temperatures.

A further object of my invention is to provide a compact unitary thermostatic switch structure that shall comprise a thermo-responsive member, a supporting member therefor and a heating element secured to the base, and a still further object of my invention is to provide a thermostatic switch that shall be of simple construction, easily manufactured and efficient in operation.

In practicing my invention, I provide a thermostatic switch for so controlling the energization of an electric circuit that a substantially constant average temperature may be maintained in a body or medium.

The thermostatic switch comprises, in general, a unitary structure that consists of a base, a heating unit and a thermo-responsive member that is capable of changing its shape abruptly when subjected to certain predetermined temperatures, whereby a portion of the said member, having contact members thereon, shall be moved from one position to another with a snap motion.

A plurality of spaced contact members and a pair of terminals therefor are attached to opposite faces of the base along its periphery but insulated therefrom. The terminals are electrically connected to certain of the spaced contact members.

The thermo-responsive member is provided with a plurality of spaced contact members located along the periphery thereof and insulated therefrom. The base and a portion of the disc are held substantially fixed, relatively to each other, and are so positioned that the respective contact members on the disc normally engage those of the base, thereby providing a current path between the terminals on the base.

The preferred form of thermo-responsive member which I propose to embody in my improved thermostatic switch is of the type disclosed in U. S. Patent #1,448,240 to Spencer and comprises, in general, a circular disc of bi-metal having a spherical dent or non-developable central portion. The characteristics of the disc are such that, when it is heated to a temperature of relatively high predetermined value, the curvature of the spherical dent or non-developable portion, as a result of the unequal rate of expansion of the metals from which the bi-metal is made, reverses suddenly, thereby causing the periphery of the disc to be moved from an initial, or normal, position to another position with a snap motion.

If the temperature of the disc is subsequently reduced to a relatively low predetermined value, the curvature of the non-developable portion again suddenly reverses in order that the disc may be returned to its normal or initial shape.

The difference between the above relatively high and low temperatures is usually denominated the temperature differential and represents that change of temperature to which the disc must be subjected in order that a reversal of curvature of its non-developable or spherical portion may be effected. In some cases, this temperature differential may vary between the limits of 50° F. to 100° F., depending upon the temperature characteristics of the metals constituting the discs of bi-metal and the method employed in the manufacture thereof.

It is, therefore, evident that the temperature of the body or medium to be controlled by means of a thermostatic switch embodying the aforesaid disc will vary between said maximum and minimum values, the difference therebetween being substantially equal to the temperature differential of the disc. In some applications, a differential of such breadth is objectionable. I have succeeded in reducing the difference between the maximum and minimum temperatures of the medium or body to be controlled by causing local heating of the disc with respect to the medium or body by means of the heating unit previously mentioned herein.

In controlling the temperature of a body or medium that receives its thermal energy from an electric heating unit or the like, the thermostatic switch employed should have its low operating temperature substantially equal to, or slightly higher in value than, the average temperature to be maintained in the body or medium. The disc, at this temperature, is normally in such position that the switch establishes an electric circuit through the electric heating unit and the heating unit embodied in the switch. The energization of the heating unit embodied in the switch causes rapid heating of the disc, thus raising its temperature to the relatively high operating temperature, at which temperature, the disc is actuated to cause the circuit through the switch to be broken and the respective heating units de-energized, when the temperature of the body or medium has increased slightly above the relatively low operating temperature of the disc. The disc being heated to a high temperature, relatively to the temperature of the body or medium, rapid cooling thereof is effected and, upon a slight decrease in the temperature of the body, the disc is caused to return to the circuit-closing position of the switch. Thus, the heating units of the body to be heated and the switch are re-energized for such period of time until the switch again operates to de-energize them. By a series of such operations, the thermostatic switch is effective to maintain a uniform temperature automatically.

The heating unit is attached securely to that face of the base on which the terminals are located. When the thermostatic switch is utilized for controlling the energization of such electric-energy-translating devices as resistor units or heating elements, the said heating unit of the switch may be connected either in series or in parallel with the resistor units to be controlled. Thus, the heating unit is energized to effect local heating of the thermo-responsive disc when the contact members of the disc and the base are in circuit-making engagement and de-energized when actuated to such position that the above contact members occupy a disengaged position relatively to each other.

In the drawings, Fig. 1 is a top plan view of the device embodying my invention.

Fig. 4 is a view in section taken on the line IV—IV of Fig. 3 of a detail embodied in my invention;

Fig. 5 is a bottom plan view of another detail embodied in the device illustrated in Figs. 1 to 3, inclusive;

Fig. 6 is a view, in section, of the detail illustrated in Fig. 5, taken on line VI—VI thereof;

Fig. 7 is a schematic illustration of an application of the device embodying my invention; and Fig. 8 is a view similar to Fig. 7 but illustrating a modification of the circuit connections shown in that figure.

Figure 1:
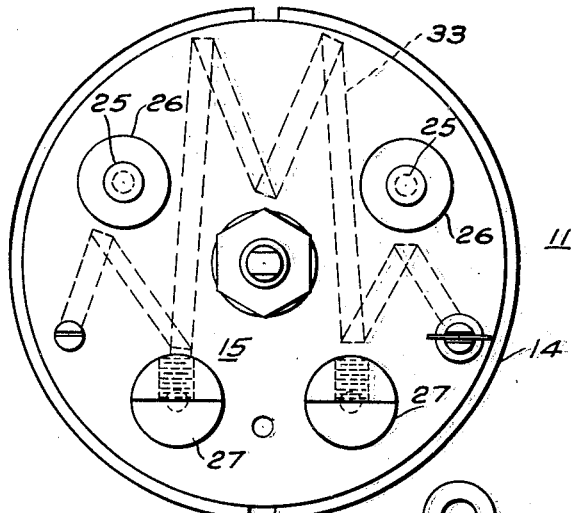
Figure 2:
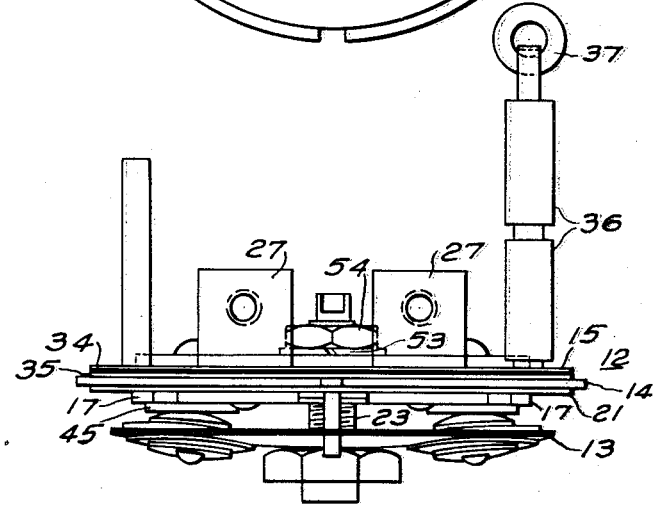
Fig. 2 is a view, in side elevation thereof.
Figure 3:
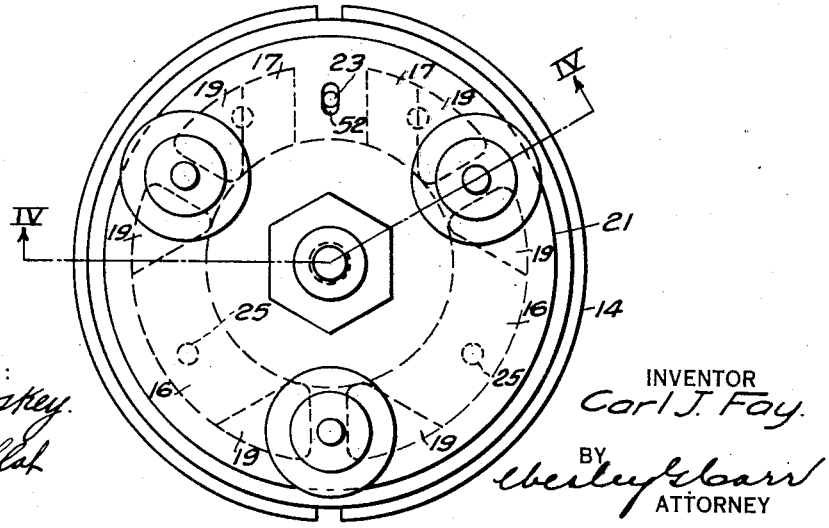
Fig. 3 is a bottom plan view of the device illustrated in Figs. 1 and 2.

As illustrated in Figs. 1 to 3 of the drawings, a thermostatic switch 11 comprises a base 12 and a thermo-responsive member 13.

The base 12 (see Figs. 1 to 6 inclusive) comprises a supporting plate 14, a heating unit 15 and a plurality of arcuate contact members 16 and 17 located on the top and bottom faces, respectively, of the plate 14, and a screw-threaded thimble 18 located at the center of the base 12.

The contact members 16 and 17 are provided with silvered end portions 19 in order that the contact members shall be resistant to oxidation and burning produced by electric arcs. The respective contact members 16 and 17 are insulated from the base by a mica washer 21 and are uniformly spaced from the center of the plate 14 by means of a mica washer 22.

A guide pin 23 projects laterally of the base 14 through an aperture therein, with which it has a pressfit, and the washer 21.

The thimble 18, located at the center of the base, projects through the heating unit 15, plate 14 and washers 21 and 22, and is provided with an annular flange 24 that rests on the heating unit 15. The other end of the thimble 18 is spun over against the mica washer 22, thereby holding the thimble securely in place with respect to the plate 14.

The contact members 16, 17 and the heating unit 15 are secured to the plate 14 by means of pins 25, washers 26 and terminals 27. The respective ends of the pins 25 are spun over against the contact members 16 and the washers 26, thereby holding the heating unit and the contact members securely against the plate 14.

The terminals 27 comprise a semi-cylindrical portion having a circular flange 29 that rests against the heating unit 15 and a pin portion 31 that projects through the switch base 12, the ends of the pin portions being spun over against the contact members 17 in order to hold these contact members and a portion of the heating unit 15 securely against the plate 14.

The heating unit 15 comprises a sheet of mica 32 having a plurality of turns 33 of resistance wire, preferably of ribbon form, wound thereon that is located between a pair of mica discs 34 and 35. The ends of the resistance wire 33 are brought out through the mica sheet 34 and serve as terminals for the heating unit 15. One end of the resistance wire 33 is provided with a pair of cylindrical insulating members 36 and a metal washer 37 through which the end of the wire is looped. It is to be understood that the other end of the resistance wire may be similarly provided with the cylindrical members 36 and the washer 37.

The thermo-responsive member 13 comprises a disc of bi-metal of the type disclosed in the previously mentioned patent to Spencer and is provided with a plurality of spaced apertures 38 (see Fig. 4) through which contact supporting pins 39 extend. The supporting pins 39 are provided with an annular flange 41, one surface of which is substantially spherical and the other substantially flat. The pins 39 are insulated from the thermo-responsive member 13 by means of a spacing washer 42 of insulating material located in the aperture 38 and a pair of insulating washers 43 disposed on each side of the member 13.

The flange 41 rests on the top washer 43. The bottom washer 43 is provided with a metallic washer 44 against which one end of the pin 39 is spun over in order to hold the pin 39 securely against the member 13. Each of the pins 39 is provided with a bridging member 45, preferably of circular or washer shape, which rests on the spherical surface of the flange 41. The contact bridging members 45 are held against the flanges 41 by spinning the end of the pin adjacent thereto against the surface of the contact members. Sufficient clearance should be provided between the members 45 and the spun-over end of the pin in order that the members 45 may rock on the spherical surface of the flange and rest flatly against the contact members 16 and 17 of the base 12, substantially as illustrated in Fig. 2 of the drawings.

The theremo-responsive disc 13 is provided with a screw-threaded stud 46 that projects through an aperture 47 at the center thereof. The stud 46 is provided with a nut 48 having a depending flange 49 thereon which fits into the aperture 47. A portion of the nut 48 rests on the edges of the aperture 47. A nut 51 engages the screw-threads at one end of the stud 46 and is so positioned that the disc is 13 supported between the nuts 48 and 51. Such clearance is maintained between the nuts 48 and 51 that the central portion of the discs 13 may move longitudinally along the stud 46. The stud 46 has such screw threaded engagement with the thimble 18 that, normally the contact members 45 are held against the contact members 16 and 17, respectively.

It is to be noted that the pin 23 registers with an elongated aperture 52 in the disc 13 to prevent the same from turning on its supporting stud 46. When the stud 46 has been adjusted to its proper position, it is locked in place by means of a spring washer 53 and a lock nut 54.

In Fig. 7 of the drawings, the thermostatic switch 11 is illustrated schematically as controlling the surface temperature of a body 54 that is heated by an electric-resistor-heating element 55. The resistor element 55 is energized from a suitable source of electromotive force 56. As there illustrated, one terminal of the heating unit 15 of the switch 11 is connected to a conductor 57 of the supply 56, and the other terminal thereof is connected to one of the terminals 27. The other terminal 27 of the switch is connected to one terminal of the heating unit 55 and the other terminal of the heating unit 55 is connected to conductor 58 of the supply 56.

It is to be understood that the heating unit 15 may be connected in parallel with the heating element 55 (see Fig. 8). In this case, one terminal of the heating unit 15 may be connected to one of the terminals 27 to which one terminal of the element 55 is connected, the other terminals of the unit 15, and the element 55 may be connected to the conductor 58 of the source of supply 56, and the other terminal 27 of the switch 11 may be connected to the supply conductor 57.

If the heating unit 15 and element 55 are connected in parallel, it is to be understood that a variable resistor 59 may be connected in series with the unit 15, whereby the heat generating capacity thereof may be regulated or adjusted to any desired value depending upon the operating temperature differential desired to which the switch shall be subjected.

If it be assumed that the temperature in the surface of the body 54 is to be maintained at substantially 400° F., the low operating temperature of the disc 13 should be approximately 415° F. The higher operating temperature of the disc 13 may, for purposes of illustration, be 465° F. When the temperature of the body 54 is below 400° F., the contact members 16, 17 and 45, respectively, are in engagement, and the heating unit 15 and the resistor element 55 are energized from the source of supply 56.

When the temperature of the body 54 becomes substantially 400° F., the combined heating effect of the heating unit 15 and the resistor element 55 is such that the disc 13 is heated to its higher operating temperature of substantially 465° F., at which temperature it changes its shape abruptly to disengage the contact members 45 from the relatively stationary contact members 16 and 17, thus deenergizing the heating units 15 and 55. The temperature of the body 54, therefore, decreases in value and, since there is a relatively large difference in temperature between the disc 13 and the body 54, the disc 13 is caused to cool rapidly to its lower operating temperature by the time the temperature of the body 54 has been reduced slightly below 400° F.

When the disc 13 attains the temperature of substantially 415° F., it suddenly reverses its curvature and re-engages contact members 45 with the stationary contact members 16 and 17, whereby the heating units 15 and 55 are caused to be re-energized. Thus, the temperature of the body 54 is successively increased and decreased by means of the switch 11, with the accompanying result that a substantially uniform average temperature of 400° F. is maintained, which average temperature has minimum and maximum values that do not depart widely from the average temperature to be maintained. Therefore, the body 54 may be caused to fluctuate in temperatur the differential of which may be, for example, 10°, whereas the normal operating-temperature differential of the disc 13 may be substantially 50° F.

By my invention, I provide a thermostatic switch for controlling the temperature of a heated body which is operable in response to a relatively wide temperature change and is effective to maintain a substantially uniform temperature in the body that has a relatively small differential between its maximum and minimum temperatures.

Various modifications may be made in the device embodying my invention without departing from the spirit and scope thereof. I desire, therefore, that only such limitations shall be placed thereon as are imposed by the prior art and by the appended claims.

I claim as my invention:

1. A switch-base structure for a thermostatic switch, said base comprising a supporting plate, a plurality of spaced contact members disposed on one face thereof and insulated therefrom, a heating unit disposed on the other face of said plate and insulated therefrom, and means for securing the heating unit, plate and contact members together compactly.

2. The combination with a thermostatic switch comprising a plate, a plurality of contact members secured thereto, a bimetallic disc having a non-developable curved portion, contact members carried thereby, and means engaging the said plate and disc for causing the contact members carried by the disc to normally engage those carried by the plate, of a heating unit secured to said plate for heating said plate only when the contact members are in engagement.

3. A base for a thermostatic switch comprising a plate, a plurality of spaced contact members disposed along the periphery of one face of said plate, said contact members being insulated from the base, a heating unit located on another face of said plate and insulated therefrom, and means extending through said plate for holding the contact members and the heating unit compactly thereagainst.

4. A base for a thermostatic switch, said base comprising a plate, a heating unit located on one face thereof, a disc of insulating material located on the other face thereof, a plurality of spaced arcuate contact members located at the periphery of said disc, and a plurality of members extending through said plate, heating unit, disc and contact members for clamping them tightly against the plate. a pair of said members serving as terminals for the said switch.

5. The combination with a base, stationary contact members attached thereto, and a thermo-responsive disc having contact members thereon for normally engaging the stationary contact members, said disc being operable to actuate the contact members thereon to a disengaged position with a snap motion when subjected to an ambient temperature of a relatively high value and returnable to its normal position when said ambient temperature decreases to a relatively low value, of a heating unit secured to said base for heating the said disc to cause the contact members thereon to be actuated to the said disengaged position when said ambient temperature has increased to a value intermediate the said relatively high and low temperatures.

6. A switch-base for a thermostatic switch comprising a supporting plate, a plurality of spaced contact members disposed on said plate and insulated therefrom, a heating unit disposed on said plate and insulated therefrom and means for securing the heating unit, plate and contact members together compactly.

In testimony whereof, I have hereunto subscribed my name this 3rd day of March, 1927.

CARL J. FAY.